(12) United States Patent
Atluri et al.

(10) Patent No.: US 7,531,918 B2
(45) Date of Patent: May 12, 2009

(54) HOT INSERTION AND EXTRACTION OF POWER SUPPLY MODULE

(75) Inventors: Prasad R. Atluri, Houston, TX (US); Hai N. Nguyen, Spring, TX (US); Reynaldo P. Domingo, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 379 days.

(21) Appl. No.: 11/093,934

(22) Filed: Mar. 30, 2005

(65) Prior Publication Data
US 2006/0226705 A1  Oct. 12, 2006

(51) Int. Cl.
*H02J 7/00* (2006.01)
*H02J 9/00* (2006.01)

(52) U.S. Cl. .......................................... 307/65; 307/127

(58) Field of Classification Search .................... 307/54, 307/65, 127; 361/84
See application file for complete search history.

(56) References Cited

U.S. PATENT DOCUMENTS

| | | | | |
|---|---|---|---|---|
| 5,559,423 | A | * | 9/1996 | Harman ...................... 323/277 |
| 6,166,455 | A | * | 12/2000 | Li .................................. 307/43 |
| 2004/0095021 | A1 | | 5/2004 | Fogleman et al. |
| 2004/0184289 | A1 | | 9/2004 | Vinciarelli |
| 2005/0024906 | A1 | | 2/2005 | Schlecht |

* cited by examiner

*Primary Examiner*—Stephen W Jackson
*Assistant Examiner*—Carlos Amaya

(57) ABSTRACT

Disclosed is a power supply module for use in an electronic system having redundant power supply modules connected to a power bus. The power supply module includes an output filter. The output filter is configured, upon insertion of the power supply module into the electronic system during operation of the electronic system, to limit reverse current flow into the power supply module from the power bus for a period of time until steady state voltage conditions exist on the power bus. The output filter is configured to then remove the current-limiting, leaving an output inductor-capacitor filter.

7 Claims, 3 Drawing Sheets

HOT INSERTION AND EXTRACTION OF POWER SUPPLY MODULE

BACKGROUND

A computer system that has to be on all the time may have more than one hot-pluggable power supply to supply electrical power to the components of the computer system. Under normal operating conditions, the power supplies work together to supply the electrical power for the computer system. Thus, each power supply generates its share (equally) of the total power required by the computer system. When one of the power supplies fails or is removed from the computer system, then the remaining power supply (or supplies) generates the entire amount of the power for the computer system. When a replacement power supply is inserted into the computer system, each power supply again generates its share (equally) of the total power requirements. In this manner, the computer system is ensured to operate almost all the time, even if one of the power supplies should fail or be replaced.

During normal operation, each power supply generates its share of the required electrical power at the same voltage level as the other power supply and supplies the electrical power through a common system power bus. Upon failure or removal of one of the power supplies, the remaining power supply quickly increases its power output to compensate for the loss of the other power supply. On the other hand, upon insertion and activation of a second power supply while a first power supply is operational in the computer system, the first power supply quickly decreases its power output while the second power supply is activated and increases its power output. Before the second power supply can become fully operational, however, reverse electrical current may flow from the power bus into the output of the second power supply. The reverse current may cause voltage fluctuations on the system power bus and in-turn disrupt the operation of the computer, unless proper precautions are taken in the design of the power supplies.

A diode, or a MOSFET configured to operate as a diode, is commonly placed on the output of the power supplies to prevent the current from flowing into the inserted or failed power supply. The diodes and MOSFETs used in this manner are commonly referred to as "ORing" diodes and MOSFETs. The ORing diode or MOSFET is reversed biased in this situation and does not allow the reverse current to flow. Under normal (i.e. forward biased) operation of the power supply, however, the ORing diode dissipates a portion of the power produced by the power supply, thereby negatively affecting the efficiency of the power supply. The ORing MOSFET dissipates less power than the ORing diode, but increasing numbers of such ORing MOSFETs are required as the total amount of power produced by the power supplies is increased, thereby increasing the number of components for (and the cost and size of) the power supplies.

DETAILED DESCRIPTION

Figure 1:
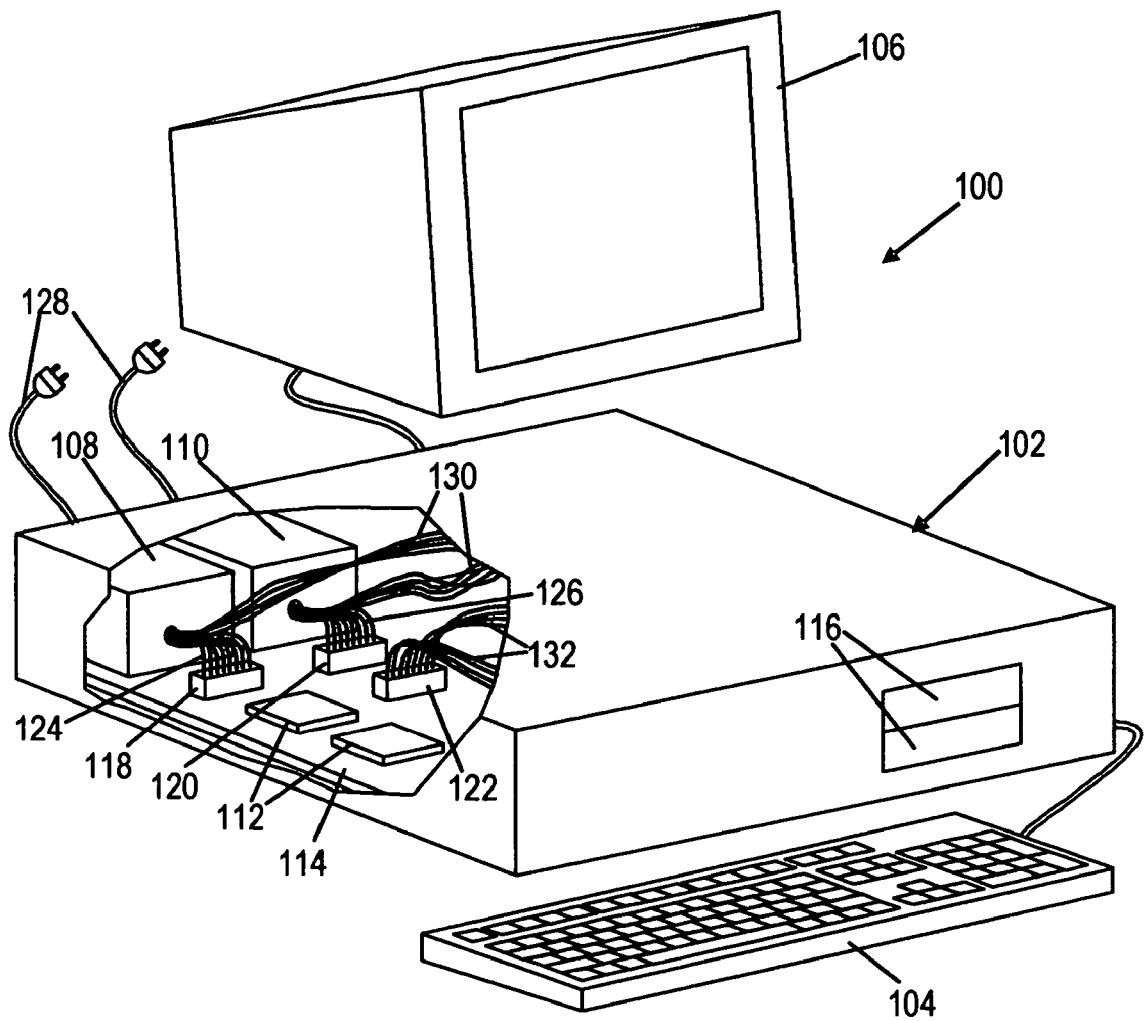
FIG. 1 is a top, front, left side perspective view of a computer system incorporating an embodiment of the present invention.

A computer system 100 incorporating an embodiment of the present invention is shown in FIG. 1 having elements such as a housing 102, a keyboard 104 and a display 106. Among other components within the housing 102, the computer system 100 includes multiple redundant, removable and hot-pluggable power supply modules 108 and 110 that supply electrical power to various electronic components 112 of the computer system 100. Although the present invention is described with respect to its use in the computer system 100, it is understood that the invention is not so limited, but may be used in any appropriate electronic system that includes redundant power supplies, regardless of any other elements included in the electronic system. Additionally, although the computer system 100 is shown having only two power supply modules 108 and 110 for simplicity of description, it is understood that the invention is not so limited, but may be used with any appropriate number of power supply modules. Furthermore, although only a single computer system 100 is shown having two power supply modules 108 and 110, it is understood that an alternative embodiment may include a system in which multiple power supplies are used to supply multiple computer systems or multiple computer system boards. Such an alternative system may include separate individual computer systems in different housings, as well as a system having multiple computer systems or multiple system boards within a single housing, such as a rack-based system.

The power supply modules 108 and 110 do not incorporate the conventional ORing diode or MOSFETs for the purpose described above. Instead, the power supply modules 108 and 110 incorporate circuitry that limits reverse current flow into the inserted power supply module 108 or 110 until steady state voltage conditions exist. The circuitry does this task without unduly disrupting electrical power supplied to the components 112. Afterwards, the circuitry converts to an appropriate output filter for the inserted power supply module 108 or 110. Additionally, without the ORing diode or MOSFETs to dissipate power, the power supply modules 108 and 110 are able to generate the desired output DC voltage and current with greater efficiency.

The computer system 100 also generally includes within the housing 102 a printed circuit board (PCB) 114 and various peripheral devices 116. The PCB 114 includes various connectors 118, 120 and 122 and electronic components (e.g. 112) mounted thereon. Some of the connectors 118 and 120 connect the PCB 114 to the power supply modules 108 and 110 via wires or cables 124 and 126, respectively. Alternative constructions for the power supply modules 108 and 110 may incorporate edge card connectors, instead of the wires or cables 124 and 126, for electrically connecting the power supply modules 108 and 110 within the computer system 100.

The power supply modules 108 and 110 receive AC power through input power cables 128 and convert the AC power into appropriate electrical power for the components 112 and devices 116. The power supply modules 108 and 110 supply the electrical power to the various components 112 on the PCB 114 through the wires or cables 124 and 126, the connectors 118 and 120 and various electrical traces on the PCB 114. The power supply modules 108 and 110 also supply electrical power through additional wires or cables 130 to some of the devices 116 that are not mounted on the PCB 114. Additionally, others of the devices 116 may receive electrical power from the power supply modules 108 and 110 through the PCB 114, the connector 122 and additional wires or cables 132. For ease of description, the following embodiments will be described with reference primarily only to the components 112.

The power supply modules 108 and 110 are mounted within the housing 102 by any appropriate means, such as by being attached to the rear wall of the housing 102 by a latch or other means. The power supply module 108 or 110 can be removed from the housing 102 by optionally disconnecting its input power cable 128, detaching the power supply module 108 or 110 from its mounting means and pulling the power supply module 108 or 110 out of the housing 102. Another power supply module 108 or 110 may be inserted into the housing 102 by reversing this procedure.

The power supply modules 108 and 110 are "hot-pluggable," which means that either power supply module 108 or 110 can be removed from and inserted into the housing 102 of the computer system 100 while the computer system 100 is operational. Removal and insertion of either power supply module 108 or 110, while the computer system 100 is operational, may be performed as long as the other power supply module 108 or 110 is functioning properly and can supply the computer system 100 with its entire power requirement. Therefore, when one of the power supply modules 108 or 110 fails or is removed during the operation of the computer system 100, the other of the power supply modules 108 or 110 quickly increases its power or current output to satisfy the entire power requirement or current load of the computer system 100. When a new power supply module 108 or 110 is inserted into the computer system 100 during operation of the computer system 100, the other power supply module 108 or 110 quickly decreases its power output, e.g. to approximately half of the power requirement of the computer system 100, and the inserted power supply module 108 or 110 quickly increases its power output to satisfy the remainder of the power requirement.

Figure 2:
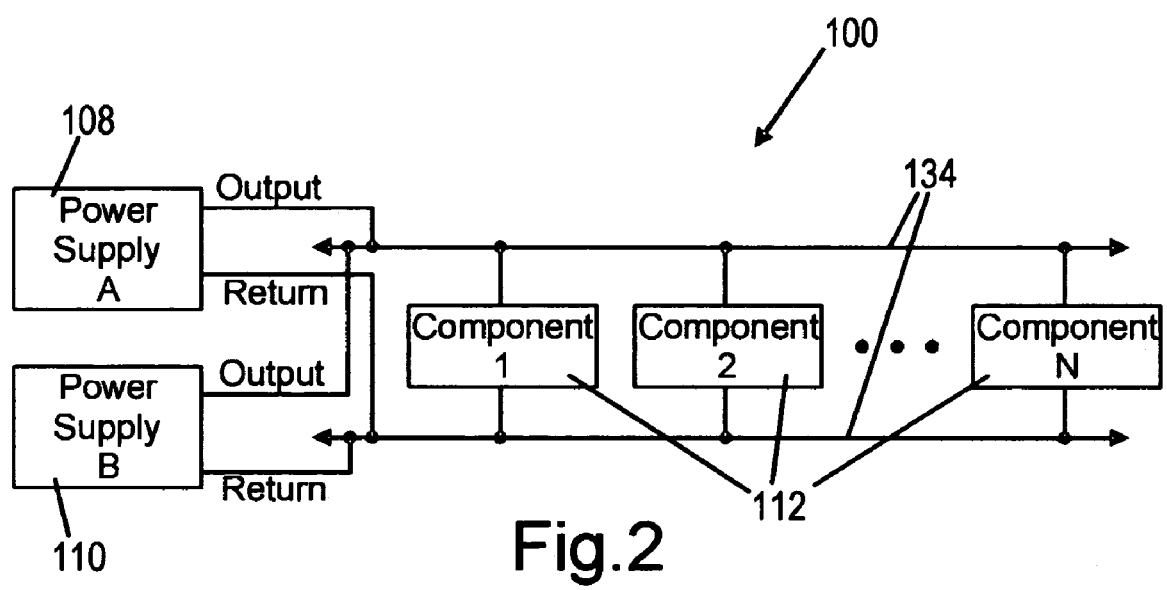
FIG. 2 is a simplified schematic diagram of the computer system shown in FIG. 1 with redundant power supply modules according to an embodiment of the present invention.

The power supply modules 108 and 110 are effectively connected in parallel through a system power bus 134 to the components 112, as shown in FIG. 2. In this manner, each power supply module 108 and 110 can supply a portion of the power requirements, e.g. approximately half, of the computer system 100 when both of the power supply modules 108 and 110 are installed within the computer system 100 and operational. When either of the power supply modules 108 or 110 fails to operate or is removed from the computer system 100, then the remaining power supply module 108 or 110 can generate and supply the total power requirements of the computer system 100, or of the components 112.

When one of the power supply modules 108 or 110 is inserted into the computer system 100, the inserted power supply module 108 or 110 is effectively connected to the system power bus 134. However, before the inserted power supply module 108 or 110 can be powered up and reach its steady state voltage, current or power output conditions, electrical current may attempt to flow backwards from the system power bus 134 into the inserted power supply module 108 or 110. This reverse current flow is due to the presence of the other power supply module 108 or 110, which is already operational and powering the computer system 100 through the system power bus 134. The power supply modules 108 and 110 incorporate a modified output inductor-capacitor (LC) filter 136 (as described below with reference to FIG. 3) to limit the reverse current, so any disturbance on the system power bus 134 will be within allowable limits.

Figure 3:
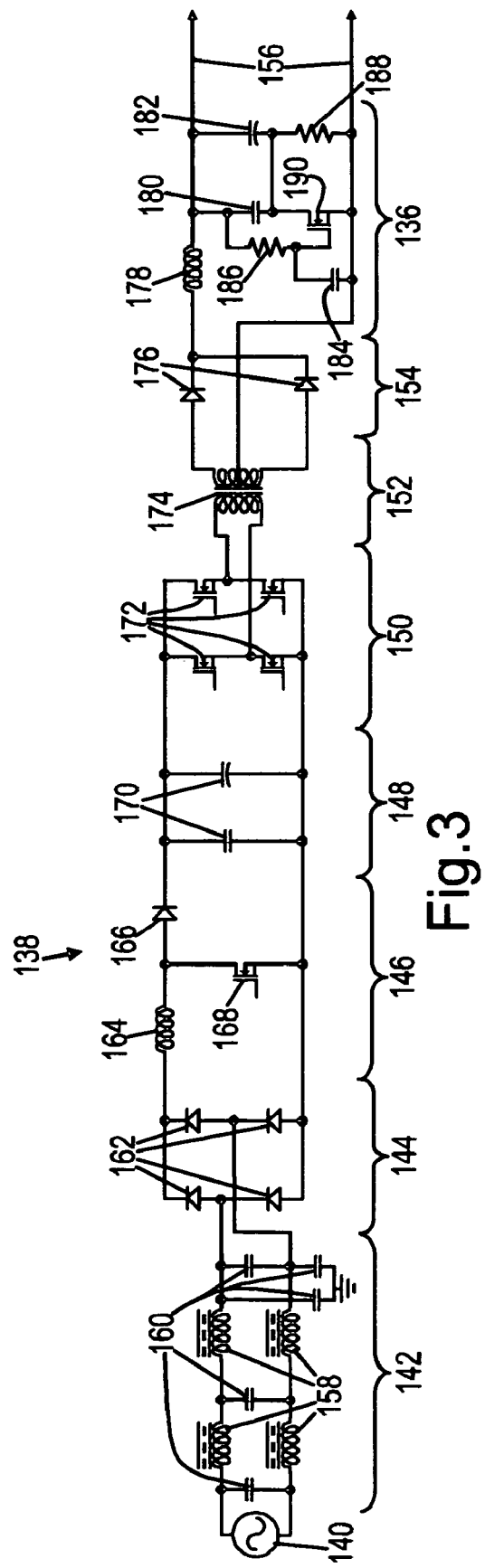
FIG. 3 is a simplified schematic diagram of a power supply module that may be incorporated in the computer system shown in FIG. 1 according to an embodiment of the present invention.

An exemplary schematic 138 for the power supply modules 108 and 110, as shown in FIG. 3, generally includes several stages between an AC source voltage 140 and the modified output LC filter 136. Although the invention is described with reference to the exemplary schematic 138, it is understood that the invention is not so limited, but may be used with any appropriate power supply design. Additionally, different stages and different circuitry for the various stages may be used in different situations to produce different voltage or power outputs depending on requirements or specifications for the situations. The exemplary stages between the AC source voltage 140 and the modified output LC filter 136 generally include an EMI filter stage 142, a rectifier stage 144, a power factor correction (PFC) stage 146, a PFC output filter stage 148, a primary switching stage 150, an isolation stage 152 and an output rectifier stage 154. A desired output DC voltage and current is produced at an output 156 thereof and supplied to the system power bus 134 (FIG. 2). The output DC voltage must remain within allowed or specified limitations.

The AC source voltage 140 may be any appropriate available AC source. The EMI filter stage 142 is illustrated as a two-stage EMI filter (inductors 158 and capacitors 160) and suppresses noise in the AC source. The rectifier stage 144 is illustrated as a diode rectifier (diodes 162), which converts the AC source to a DC source. The PFC stage 146 is illustrated as a "boost" power factor correction stage (inductor 164, diode 166 and transistor 168) that puts the line voltage and line current in phase. The PFC output filter stage 148 (capacitors 170) filters out any AC component to maintain the voltage at this point at a desired DC voltage. The primary switching stage 150 generally includes switching transistors 172, which operate a high frequency isolation transformer 174 of the isolation stage 152, which isolates the output 156 for safety. The output rectifier stage 154 (diodes 176) and the modified output LC filter 136 rectify a high frequency output of the isolation stage 152 to form the desired output DC voltage and current.

The modified output LC filter 136 generally includes a series inductor 178, capacitors 180, 182 and 184, resistors 186 and 188 and a switching transistor 190. Without the ORing MOSFETs used by the prior art, the modified output LC filter 136 uses fewer components and, therefore, has a smaller size and cost than the prior art described above.

During steady state operation conditions in which both power supplies 108 and 110 (FIGS. 1 and 2) are supplying power to the computer system 100, the resistor 186 and the capacitor 184 hold the transistor 190 "on," like a closed switch, so the resistor 188 is shorted out. According to the resulting circuitry, therefore, the inductor 178 and the capacitors 180 and 182 operate as an output LC filter to maintain the desired output DC voltage and current within specified limitations in this situation.

Upon insertion of one of the power supply modules 108 or 110 while the other power supply module 108 or 110 is operational, the resistor 186 and the capacitor 184 form an RC circuit having an RC time constant. Due to the RC time constant, there is a time delay (e.g. about 100 microseconds to about 1 second), during which the capacitor 184 is charged up before the transistor 190 is turned "on." In this situation, therefore, before the transistor 190 is turned "on," the resistor 188 forms an RC circuit with the capacitors 180 and 182. In this RC circuit (180, 182 and 188), the resistor 188 limits the reverse current flow from the system power bus 134 (FIG. 2), so the capacitors 180 and 182 can be charged to the voltage level of the system power bus 134 without drawing a very large current that could unduly disrupt, or "pull down," the system power bus 134. The value of the current-limiting resistor 188 is such that the current drawn from the system power bus 134 and the other power supply 108 or 110 is negligible compared to the load current of the other power supply 108 or 110. For example, in a particular embodiment in which the power supply modules 108 and 110 produce a 12-volt output, a value of 12 Ohms for the current-limiting resistor 188 will limit the charging current to 1 Amp, which is acceptable when the output current is significantly larger than 1 Amp. In this manner, the system power bus 134 reaches steady state conditions upon insertion of one of the power supply modules 108 or 110 without undue disruptions or fluctuations in the voltage level of the system power bus 134. In other words, the DC voltage on the system power bus 134 remains within the specified limitations, because the modified output LC filter 136 minimizes disturbances on the power bus. When the transistor 190 is turned "on," the RC circuit (180, 182 and 188) is effectively converted to the output LC filter (178, 180 and 182) for normal operation of the power supply module 108 or 110, because the current-limiting resistor 188 is effectively removed from the RC circuit (180, 182 and 188).

When it is necessary to extract one of the power supply modules 108 or 110 from the computer system 100 while the computer system 100 is operating under both power supply modules 108 and 110, the AC source voltage 140 is disconnected, thereby turning off the power supply module 108 or 110 being extracted. Then the remaining power supply module 108 or 110 is automatically instructed to increase its power, or current, output to handle the load current previously satisfied by the turned-off power supply module 108 or 110. The current flowing through the modified output LC filter 136 of the turned-off power supply module 108 or 110 is reduced to zero. At this point, extraction of the turned-off power supply module 108 or 110 will not disturb the system power bus 134.

Alternatively, one of the power supply modules 108 or 110 may be extracted from the computer system 100 without disconnecting the AC source voltage 140. The power supply module 108 or 110 can be extracted in this manner because signal pins used to receive control signals from the computer system 100 are shorter than signal pins used to transfer electrical power. The control signals from the computer system 100 control the operation of the power supply module 108 or 110, e.g. indicate to the power supply module 108 or 110 the amount of power to generate. Without these control signals, for instance, the power supply module 108 or 110 will not attempt to generate electrical power for the computer system 100. Because of the difference in lengths of the signal pins, the signal pins for the control signals will "break" first. Loss of the control signals causes the extracted power supply module 108 or 110 to turn itself off before the electrical power is "broken." In this manner, the remaining power supply module 108 or 110 can be instructed, e.g. via its control signals, to increase its power/current output, and the current flowing through the modified output LC filter 136 of the extracted power supply module 108 or 110 can be reduced to zero, while the extracted power supply module 108 or 110 is being pulled from the computer system 100.

Additionally, since the capacitors 180 and 182 are charged to the voltage level of the system power bus 134 when the computer system 100 is operational, loss of the AC input at the AC source voltage 140 in one of the power supply modules 108 or 110 will not disrupt the system power bus 134. At this point, the diodes 176 become reverse biased and the capacitors 180 and 182 are fully charged, so there is no current through the output 156 of the deactivated power supply 108 or 110. Therefore, the deactivated power supply module 108 or 110 may be extracted from the computer system 100 without disruption of the system power bus 134. In other words, the DC voltage on the system power bus 134 remains within the specified limitations in these situations.

We claim:

1. A power supply module for use in an electronic system having redundant power supply modules connected to a power bus, the power supply module comprising:
   an output filter further comprising:
     an output configured to supply a DC signal to the electronic system;
     an inductor in series with the output;
     a resistor-capacitor circuit comprising in series a resistor and a capacitor placed in parallel across the output; and
     a switch in parallel with the resistor operable to short out the resistor when turned on, the switch being operable to be turned on after a time delay upon insertion of the power supply module into the electronic system;
   and wherein upon insertion of the power supply module into the electronic system during operation of the electronic system, to limit reverse current flow into the power supply module from the power bus for a period of time until steady state voltage conditions exist on the power bus and then to remove the current-limiting resistor, leaving an output inductor-capacitor filter, and upon shorting out of the resistor, the inductor and capacitor are configured to form the inductor-capacitor filter for the DC signal.

2. A power supply module as defined in claim 1 wherein:
   the aforementioned resistor-capacitor circuit is a first resistor-capacitor circuit; and
   the output filter further comprises a second resistor-capacitor circuit operable to turn on the switch after the time delay upon insertion of the power supply module.

3. A computer system comprising:
   electronic components;
   a power bus configured to transfer electrical power to the electronic components; and
   multiple redundant removable and insertable power supply modules operable to supply the electrical power through the power bus to the electronic components, each power supply module comprising:
   an output filter configured, upon insertion of the power supply module into the computer system during operation of the computer system, to limit reverse current flow into the power supply module from the power bus for a period of time until steady state voltage conditions exist on the power bus and then to remove the current-limiting, leaving an output inductor-capacitor filter, and
   for each power supply module:
   the output filter comprises an inductor, at least one capacitor and a current-limiting resistor, the capacitor and the current-limiting resistor forming a resistor-capacitor circuit in parallel across an output of the power supply module;
   the output filter is configured to limit the reverse current flow by the resistor-capacitor circuit;
   the output filter is configured to remove the current-limiting by removing the current-limiting resistor, leaving the capacitor in conjunction with the inductor; and
   the output filter is configured to remove the current-limiting resistor by shorting out the current-limiting resistor.

4. A computer system as defined in claim 3 wherein:
   for each power supply module:
   the output filter is configured to short out the current-limiting resistor by closing a switch across the current-limiting resistor after the period of time.

5. A computer system as defined in claim 4 wherein:
   for each power supply module:

the aforementioned resistor-capacitor circuit is a first resistor-capacitor circuit;

the output filter comprises a second resistor-capacitor circuit; and the second resistor-capacitor circuit is configured to close the switch after the period of time, which depends on a time constant of the second resistor-capacitor circuit.

6. A method for preventing disruption of an electronic system supporting redundant power supply modules upon insertion of one of the redundant power supply modules, comprising:

limiting a current flow into the inserted power supply module from a power bus of the electronic system for a period of time;

removing the current-limiting to form an output inductor-capacitor filter for the inserted power supply module;

limiting the current flow by a resistor until a capacitor is charged to a voltage level of a power bus of the electronic system; and removing the current limiting by shorting out the resistor to form the output inductor-capacitor filter with the capacitor and an inductor.

7. A method as defined in claim 6 wherein:

the resistor is shorted out by a transistor that is turned on after the period of time.

* * * * *